US012749370B2

(12) United States Patent
McGlothen et al.

(10) Patent No.: US 12,749,370 B2
(45) Date of Patent: Sep. 29, 2026

(54) SYSTEMS AND METHODS FOR EXPEDITED OUTPUTS IN ELECTRONIC GAMING

(71) Applicant: Aristocrat Technologies, Inc., Las Vegas, NV (US)

(72) Inventors: Christopher McGlothen, Las Vegas, NV (US); Max Skaare, Laguna Niguel, CA (US); Peter Papez, Las Vegas, NV (US); Brian Allmaras, Henderson, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 541 days.

(21) Appl. No.: 18/214,179

(22) Filed: Jun. 26, 2023

(65) Prior Publication Data

US 2023/0419775 A1 Dec. 28, 2023

Related U.S. Application Data

(60) Provisional application No. 63/356,444, filed on Jun. 28, 2022.

(51) Int. Cl.
*G07F 17/32* (2006.01)

(52) U.S. Cl.
CPC ...... *G07F 17/3237* (2013.01); *G07F 17/3251* (2013.01); *G07F 17/3258* (2013.01)

(58) Field of Classification Search
CPC ............. G07F 17/3225; G07F 17/3232; G07F 17/3234; G07F 17/3237; G07F 17/3241
See application file for complete search history.

(56) References Cited

U.S. PATENT DOCUMENTS 8,753,194 B2 6/2014 Schneider
9,715,787 B1 7/2017 Sanford
2004/0106449 A1* 6/2004 Walker ................ G07F 17/3227 463/25
2007/0099696 A1* 5/2007 Nguyen ................. G06Q 40/02 463/25
2011/0256917 A1* 10/2011 Andersson .......... G07F 17/3225 463/17
2012/0122584 A1* 5/2012 Nguyen .............. G07F 17/3209 463/25
2017/0053489 A1 2/2017 Colvin
2019/0122481 A1* 4/2019 Risnoveanu ..... G06Q 10/06398
2021/0321569 A1 10/2021 Fong

FOREIGN PATENT DOCUMENTS

WO WO-2017146565 A1 * 8/2017 ......... G07F 17/3244

* cited by examiner

*Primary Examiner* — Jasson H Yoo
(74) *Attorney, Agent, or Firm* — Armstrong Teasdale LLP

(57) ABSTRACT

A rapid output system in electronic gaming that includes a first computer resource and a second computer resource is described. The first computer resource is configured to receive a message including first gaming data wherein the first gaming data is associated with a jackpot that has been achieved at a gaming device at a gaming establishment and automatically verify the jackpot as a valid jackpot by comparing at least part of the first gaming data to second gaming data associated with the gaming device. The second computer resource is configured to transmit a request for payment data to a computing device associated with a player associated with the jackpot, receive the payment data from the computing device, and based upon the payment data, interface with a banking computer system to initiate payment of at least part of the jackpot to the player in real-time.

20 Claims, 12 Drawing Sheets

| Media functions | Position | Storage media number |
|---|---|---|
| Game CF | ATI Verify no. | 0000 0000 0000 0000 0000 0000 0000 0000 |
| Game CF | GLI Verify no. | 0000 0000 0000 0000 0000 0000 0000 0000 |
| GAT3 | | |
| GAT 3.2 Game (Sha-1 hash) | | |
| 0000 0000 0000 0000 0000 0000 0000 0000 | | |
| GAT 3.2 Game (Component checksum) | | |
| 0000 0000 0000 0000 0000 0000 0000 0000 | | |
| GAT 3.5 Game | | |
| FastCashV1.xx63712 | | |
| 0000 0000 0000 0000 0000 0000 0000 0000 | | |

FIG. 7

SYSTEMS AND METHODS FOR EXPEDITED OUTPUTS IN ELECTRONIC GAMING

CROSS REFERENCE TO RELATED APPLICATIONS

This application claims the benefit of priority to U.S. Provisional Patent Application No. 63/356,444, filed Jun. 28, 2022, the contents of which are hereby incorporated herein by reference in their entirety.

TECHNICAL FIELD

The field of disclosure relates generally to electronic gaming, and more specifically, to systems and methods for providing expedited outputs in electronic gaming.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Currently, a manual, time-intensive, and laborious process is required to pay players/customers who "hit" a jackpot or other large payout (e.g., three or more days). Certain benefits may be provided if payouts are made more quickly. For example, faster payouts increase efficiency in casino operations by reducing wait times of players and time required to be spent by certain staff in facilitating the payouts. Accordingly, improved systems and methods for payouts (e.g., at a gaming establishment) are desired.

BRIEF DESCRIPTION

In one aspect, a rapid output system in electronic gaming is described. The rapid output system includes a first computer resource including one or more first processors and one or more first memories. The one or more first processors are configured to receive a message including first gaming data wherein the first gaming data is associated with a jackpot that has been achieved at a gaming device at a gaming establishment and automatically verify the jackpot as a valid jackpot by comparing at least part of the first gaming data to second gaming data stored in the one or more first memories wherein the second gaming data is associated with the gaming device. The rapid output system also includes a second computer resource including one or more second processors and one or more second memories. The one or more second processors are configured to transmit a request for payment data to a computing device associated with a player associated with the jackpot, receive the payment data from the computing device, and based upon the payment data, interface with a banking computer system to initiate payment of at least part of the jackpot to the player in real-time.

In another aspect, at least one non-transitory computer-readable storage medium with first instructions and second instructions stored thereon is described. Execution of the first instructions by at least one first computer resource including at least one first processor cause the at least one first computer resource to receive a signal including first gaming data wherein the first gaming data is associated with a jackpot at a gaming device at a gaming establishment and automatically verify the jackpot as a valid jackpot by comparing at least part of the first gaming data to second gaming data stored in a database wherein the second gaming data is associated with the gaming device. Execution of the second instructions by at least one second computer resource including at least one second processor cause the at least one second computer resource to transmit a request for payment data to a computing device associated with a player associated with the jackpot, receive the payment data from the computing device, and in response to receiving the payment data, communicate with a banking computer system to initiate payment of at least part of the jackpot to the player in real-time.

In another aspect, a method for providing expedited outputs in electronic gaming implemented by a first computer resource including a first processor and a second computer resource including a second processor is described. The method includes receiving, by the first computer resource, a message including first gaming data wherein the first gaming data is associated with a suspect jackpot that has been triggered at a gaming device at a gaming establishment and automatically verifying, by the first computer resource, the suspect jackpot as a valid jackpot by comparing at least part of the first gaming data to second gaming data stored in memory wherein the second gaming data is associated with the gaming device. The method also includes transmitting, by the second computer resource, a request for payment data to a computing device associated with a player associated with the valid jackpot, receiving, by the second computer resource, the payment data from the computing device, and interfacing, by the second computer resource, with a banking computer system based on the payment data to initiate payment of at least part of the valid jackpot to the player in real-time.

BRIEF DESCRIPTION OF THE DRAWINGS

FIG. 7 illustrates another example graphical user interface (GUI) for providing expedited outputs in electronic gaming in accordance with the present disclosure.

DETAILED DESCRIPTION

Figure 1:
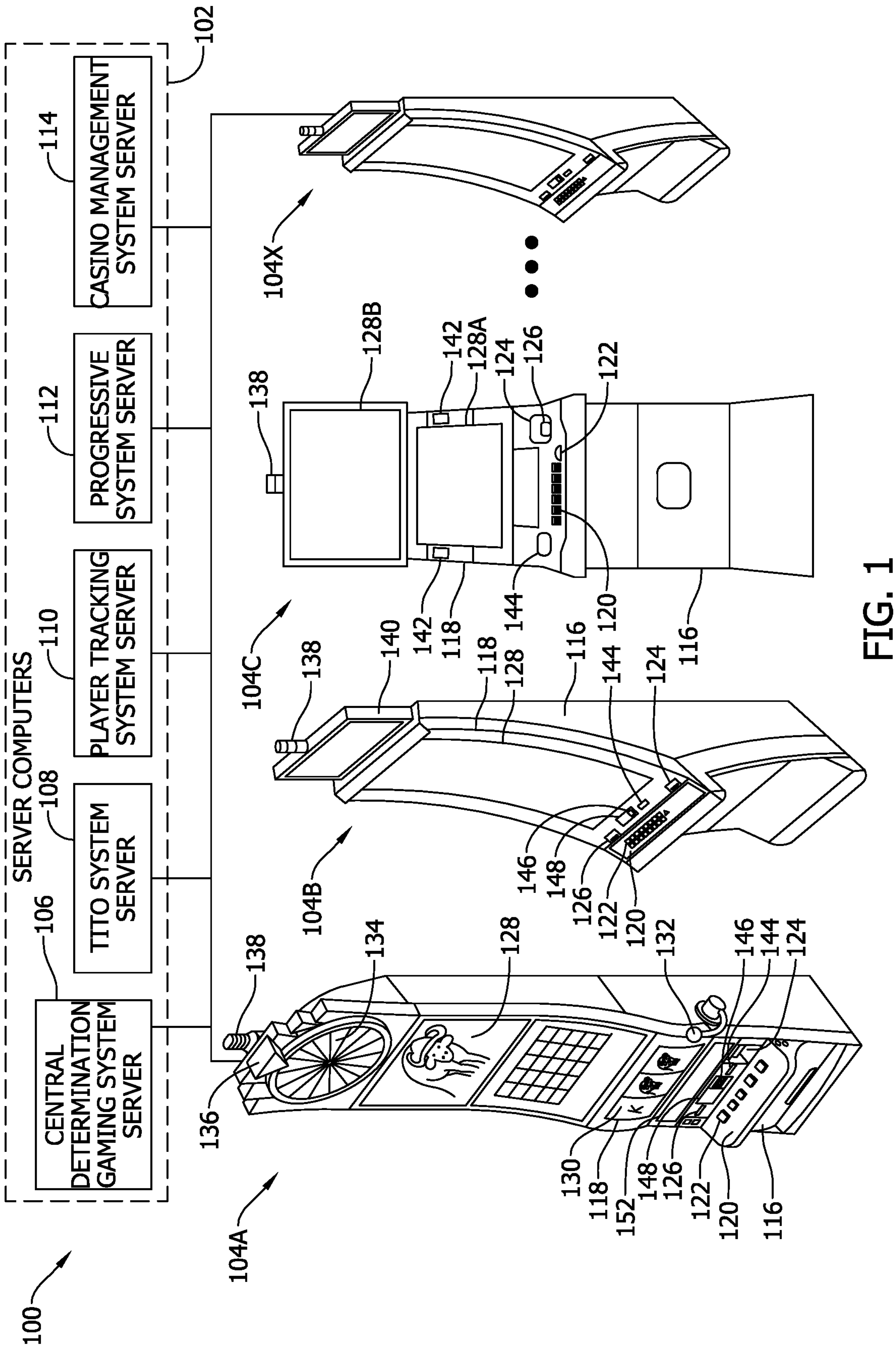
FIG. 1 is an exemplary diagram showing several EGMs networked with various gaming related servers.

Described herein are multi-site progressive (MSP) systems and methods that deliver a faster output (e.g., jackpot payment) experience for players of electronic games than known systems and methods. An MSP system, as described herein, is designed to output an initial payment of a jackpot payment to winning players faster than known payout systems, and thus, add to the user excitement of winning the jackpot. For example, when a multi-site progressive jackpot is won by a player, a first computer resource of the MSP system verifies the occurrence of the jackpot event with a gaming establishment (e.g., a casino) where the jackpot occurred, and a separate, second computer resource of the MSP system verifies payment information and facilitates the transfer of the funds to the player.

In one embodiment, an option may be available to the casino operators to choose to pay a winning game player a full jackpot amount for certain jackpots, or an initial percentage payment (e.g., five percent) of certain jackpots wherein the casino operator is then reimbursed by check (or other mechanism) within a predetermined time period (e.g., four hours or less), as examples.

Further, an option may be provided to pay players directly (e.g., from a game provider as opposed to from a casino operator) by check for a full or percentage jackpot amount (e.g., within 4 hours of a jackpot "hitting" at a gaming device). Some payment options may be fulfilled at least in part by a Field Service Technician (FST) when they arrive on-site to complete a full verification (e.g., within 4 hours) of the jackpot win (e.g., delivery of a check). To allow payment to a player without an on-site verification by a FST, a casino representative may complete an on-phone or online verification (e.g., or other communication, such as email or instant messaging via the internet) with an MSP representative and/or MSP environment (e.g., including the first computer resource and second computer resource described herein) to, as examples, ensure the validity of the jackpot, and supply game player ID information, proof of payment, and associated tax forms (e.g., by a first computer resource).

In other words, the MSP system described herein is configured to utilize a two-stage process to verify jackpot events (e.g., by a first computer resource) and initiate payment of jackpot events in real-time (e.g., by a second computer resource) to an appropriate player (e.g., player account). To improve security and ensure the output is directed to the correct person (e.g., mitigate risk associated with transferring funds to an incorrect individual), the MSP system uses two separate and different computer resources when performing the two-stage process. As explained herein, a first computer resource having a first communication channel verifies the occurrence of a jackpot event with a gaming establishment and a separate, second computer resource having a second communication channel verifies payment information and facilitates the transfer of funds to a player.

Certain technical problems are solved by the MSP system embodiments described herein. For example, prior payment processes are manual-based and time-intensive when issuing payment to a player. Moreover, using these known processes and systems, the actual payment of the jackpot award typically occurs much later after the jackpot event. Often, the delay originates in the delay in verifying and processing the fund transfer to the player. Thus, the embodiments provided herein provide technical solutions to reduce the payment time to a player after hitting a jackpot or other large payout.

For example, technical solutions provided include an improved MSP system that partitions payment of jackpot awards into two different stages. The first stage uses a first computer resource to verify the occurrence of a jackpot event with the gaming establishment via a first communication channel, as explained herein. In some embodiments, a machine learning model may be trained and utilized to verify a jackpot as valid or identify suspicious activity associated with a jackpot (e.g., automatically identify that certain parameters for jackpot verification, as explained herein, are or are not verified).

During the first stage, the first computer resource will also obtain personal and tax information from the player to satisfy gaming regulation requirements. In some embodiments, the personal information, ID verification (e.g., scanned photo of drive license), and tax information may be filled out and sent to the MSP system electronically (e.g., via inputs at one or more interfaces, as explained herein).

Based on the data received during the first stage, a second computer resource during the second stage can initiate communication with a player to obtain banking information (e.g., via a second communication channel different from the first communication channel) to initiate the real-time payment of funds. Initiating of the real-time payments of funds may include: (1) initiating a real-time fund transfer between bank accounts, digital wallet accounts, or other financial institution accounts, (2) initiating the creation and printing of a check at a location in proximity to the player, (3) initiating a wire transfer, or (4) initiating the loading of funds onto a debit card. Depending on the selected payment option, the time delay for funds to appear in a player's account or be available to be used in a player's bank account, wallet, or financial institution account may vary. But under any of these fund transfer options, the funds are provided to the player much faster (e.g., days faster) than under the known conventional systems.

To mitigate security risks, the improved MSP system includes a second computer resource that is separate from and operates independently from the first computer resource (e.g., and may utilize different communication channels from the first computer resource). As part of the second stage, the second computer resource interfaces with a financial institution to provide authorization and payment information to initiate the payment of funds associated with a jackpot event. Thus, improved systems and methods are provided that solve at least the technical problems described herein.

In other words, the improved MSP system described herein delivers a faster jackpot payment experience for players while still ensuring that the correct player is being paid and all the requirements associated with making such payment are satisfied and recorded. The "rapid pay" process is implemented by the MSP system to get the initial payment in the hands of the player faster and build on the excitement of winning a jackpot.

The MSP system is configured to enable casino operators the option to choose to pay a player a full jackpot amount or an initial percentage payment with later reimbursement by check within four hours. Additionally, the MSP system offers an option for a game provider to pay the player directly by check for those same amounts within four hours.

In some embodiments, a field service technician (FST) may arrive on-site to complete a full verification within four hours or less (e.g., after pre-verification and initiation of payment to the player) of the jackpot being won.

For the MSP system to allow payment to a player without an on-site verification by an FST, a casino representative may complete an on-phone or online verification with the MSP system to ensure the validity of the jackpot and supply game player ID information, proof of payment and associated tax forms.

In the example embodiment, an improved MSP system (e.g., a rapid pay system or rapid output system) in electronic gaming is provided. The rapid output system includes a first computer resource including one or more first processors and one or more first memories and a second computer resource including one or more second processors and one or more second memories. In some embodiments, the first computer resource and second computer resource are implemented on the same device. In the example embodiment, the first computer resource and the second computer resource are implemented on different computing devices and are associated with separate communication channels (e.g., for security purposes).

The first computer resource is configured to receive a message including first gaming data wherein the first gaming data is associated with a jackpot that has been achieved at a gaming device at a gaming establishment (e.g., environmental observation data associated with an environment of at least one of the gaming device or the gaming establishment, gaming device data associated with the gaming device including a serial number of the gaming device, etc.). For example, the first computing resource may prompt a casino computer device (e.g., associated with an FST or other casino personnel) to display a graphical user interface (GUI) associated with the first gaming data wherein the GUI includes a plurality of input areas each associated with at least one of a plurality of verification fields and receive the message including the first gaming data (e.g., via a first communication channel) wherein the first gaming data further includes at least one input received at at least one of the plurality of input areas.

The first computer resource is also configured to automatically verify the jackpot as a valid jackpot by comparing at least part of the first gaming data to second gaming data stored in the one or more first memories wherein the second gaming data is associated with the gaming device.

The second computer resource is configured to transmit a request for payment data (e.g., tax data associated with the player including a completed IRS Form W-9, player data associated with the player including a copy of a player photo identification, a player email address, and a player phone number, etc.) to a computing device (e.g., a device at the gaming establishment in communication with the second computer resource) associated with a player associated with the jackpot, receive the payment data from the computing device (e.g., via a second communication channel), and, based upon the payment data, interface with a banking computer system to initiate payment of at least part of the jackpot to the player in real-time.

In some embodiments, the second computer resource is configured to determine that the payment data indicates that the player has requested to be paid via a debit card and initiate the payment of at least the part of the jackpot to the player by causing at least the part of the jackpot to be loaded on to the debit card from the banking computer system.

In some embodiments, the second computer resource is configured to determine that the payment data indicates that the player has requested to be paid via an electronic transfer to a player account and initiate the payment of at least the part of the jackpot to the player by causing at least the part of the jackpot to be transferred to the player account via the banking computer system.

In some embodiments, the second computer resource is configured to determine that the payment data indicates that the player has requested to be paid via a check, transmit an authorization for payment of at least the part of the jackpot to the banking computer system, and transmit instructions to print the check to a check printing device wherein the check printing device is configured to print the check upon receipt of the instructions and wherein the check is associated with at least the part of the jackpot.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
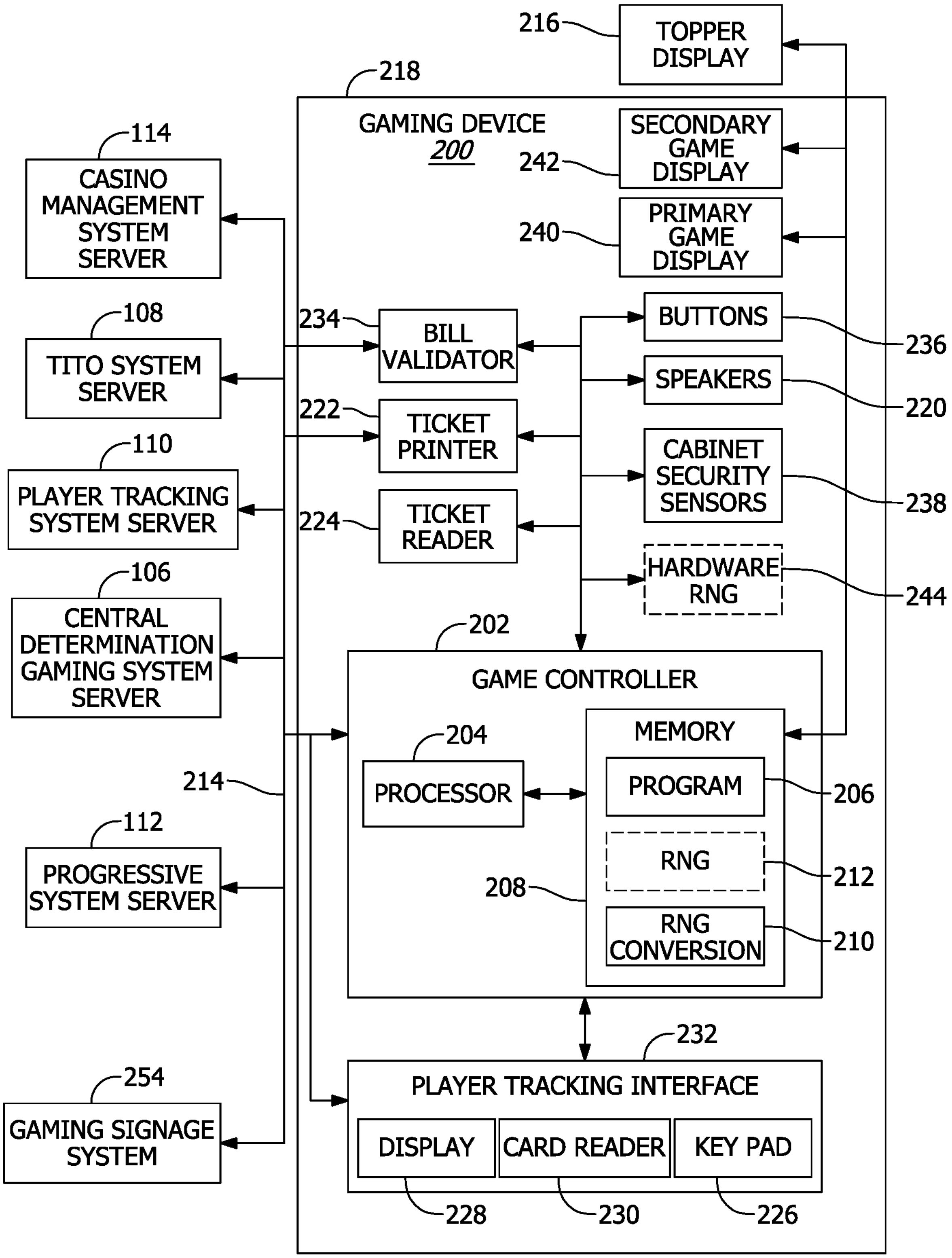
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
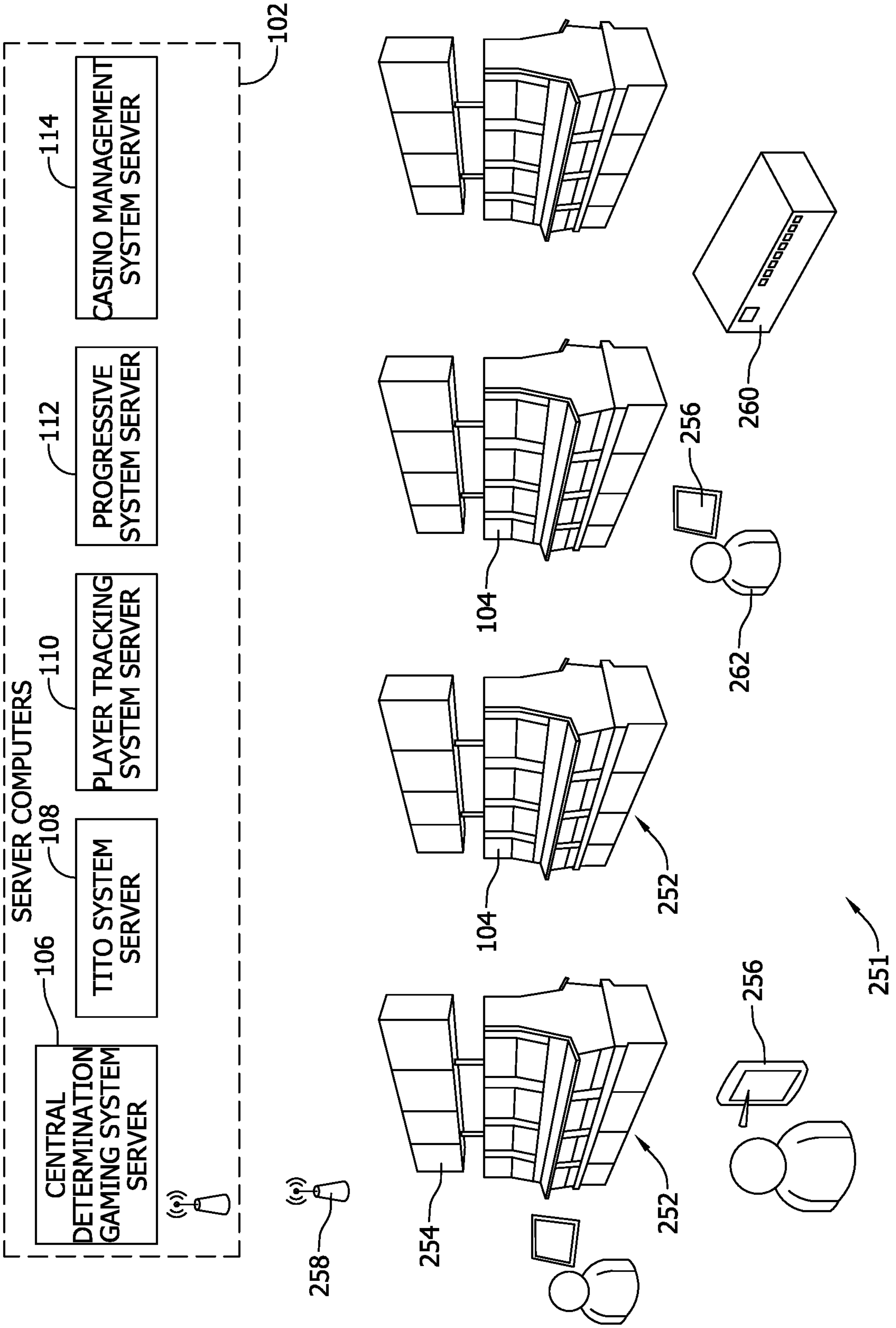
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
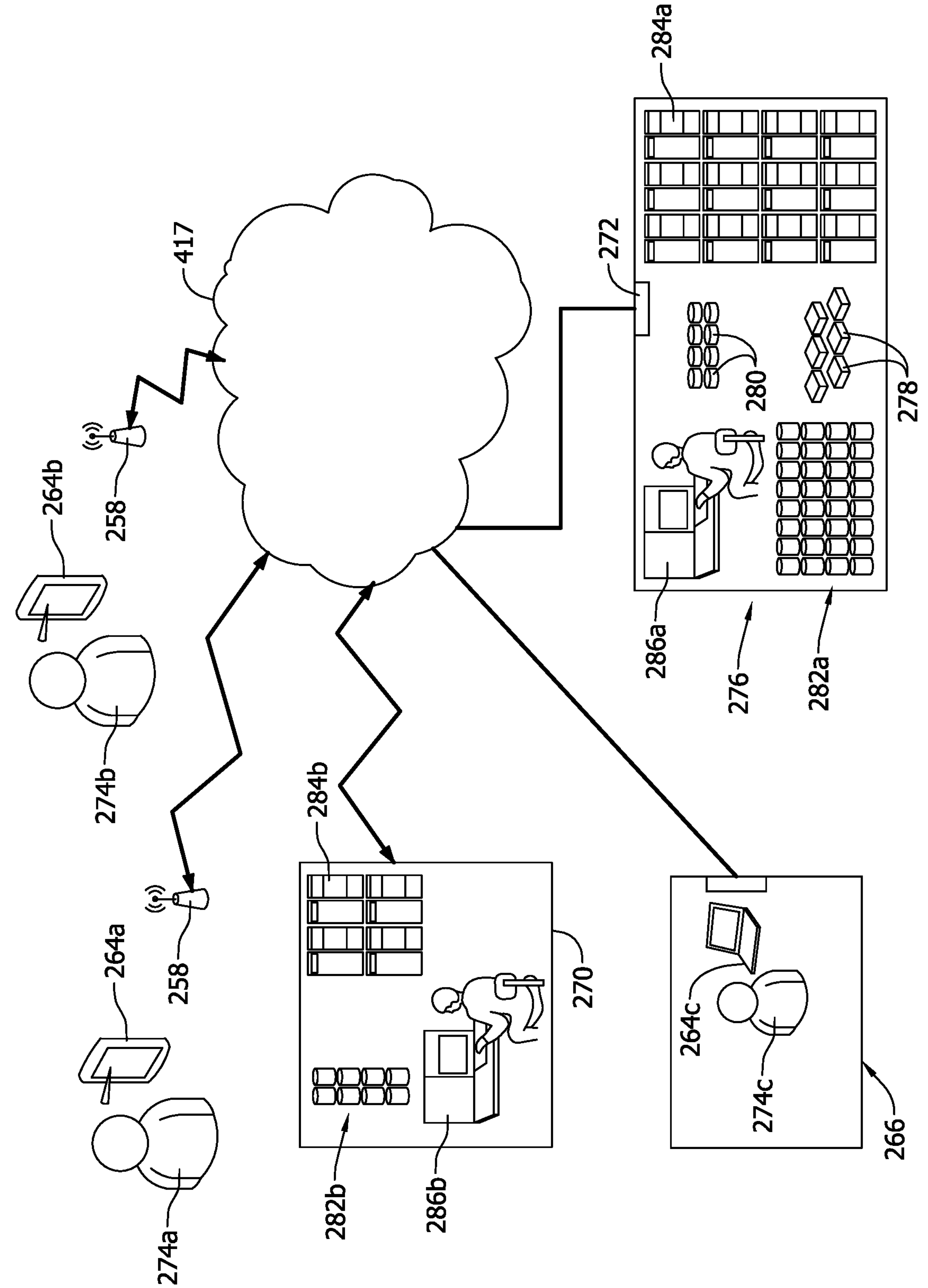
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
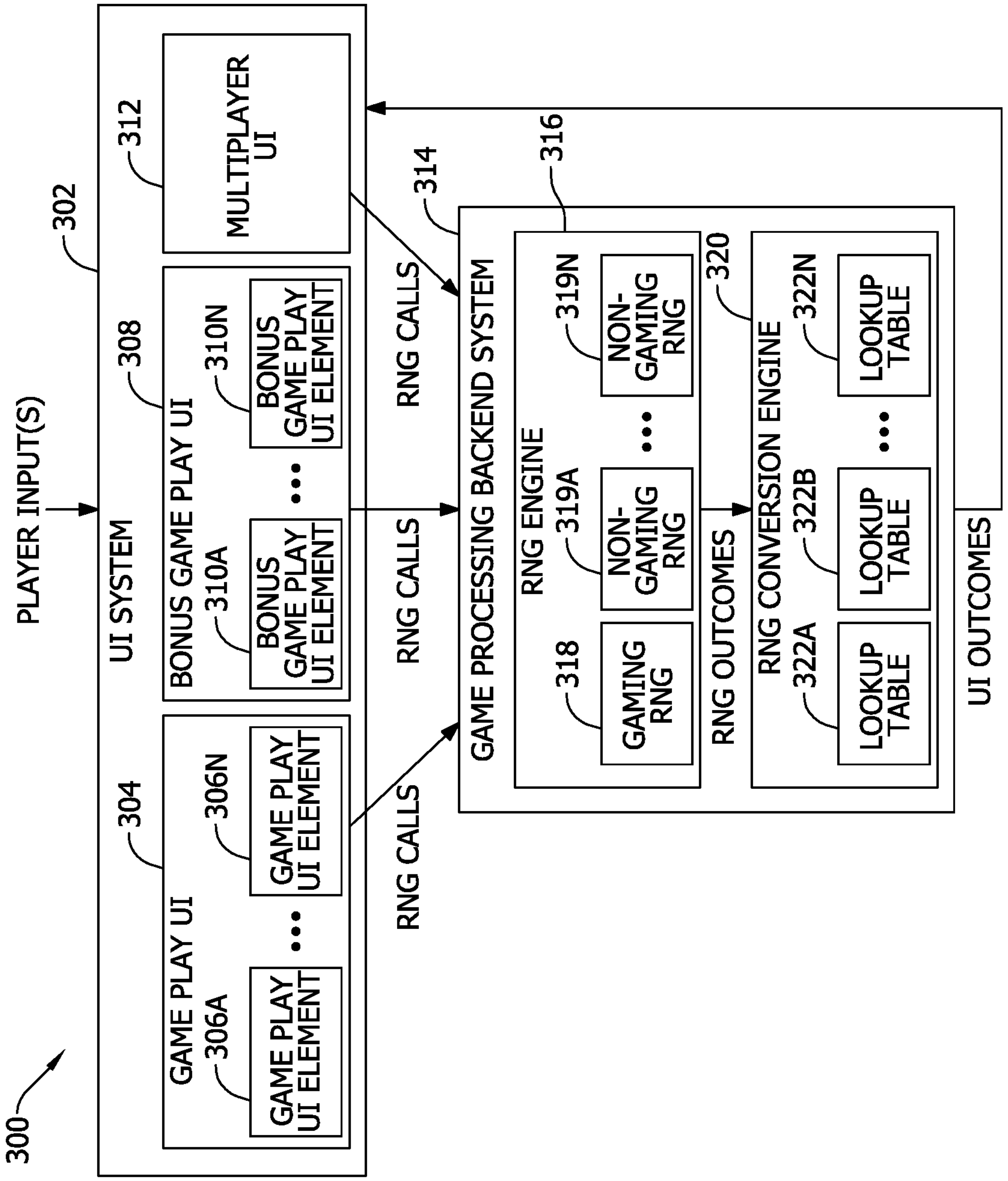
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
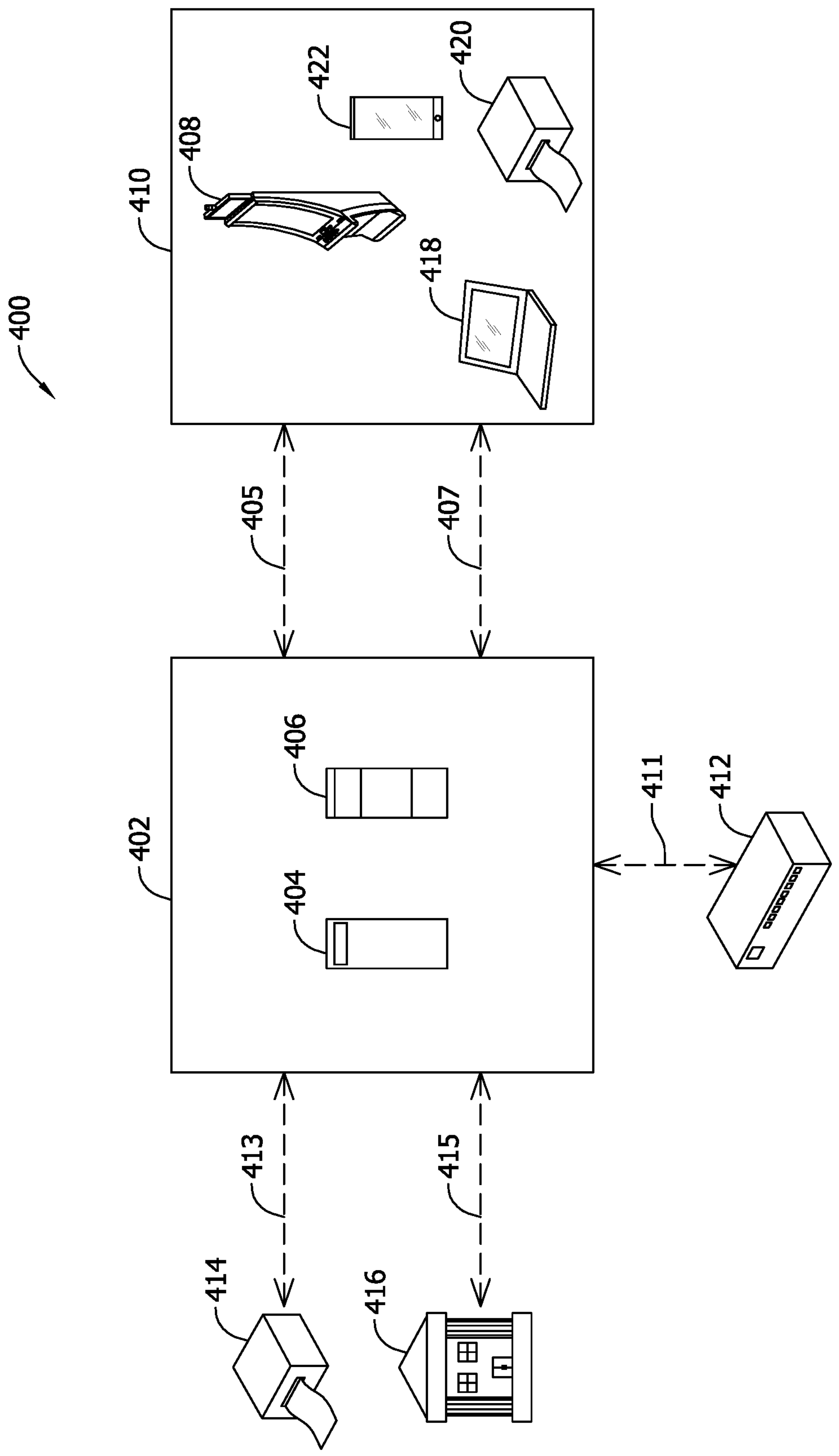
FIG. 4 illustrates an example architecture for providing expedited outputs in electronic gaming, in accordance with the present disclosure.

FIG. 4 illustrates an example MSP system 400 for providing expedited outputs in electronic gaming, in accordance with the present disclosure. As shown in FIG. 4, MSP system 400 includes an MSP environment 402 including a first computer resource 404 and a second computer resource 406. In some embodiments, first computer resource 404 and second computer resource 406 are implemented on the same device. In some embodiments, MSP environment 402 includes different computing devices and first computer resource 404 and second computer resource 406 are implemented on different devices. In the example embodiment, first computer resource 404 and second computer resource 406 are associated with separate communication channels 405, 407 (e.g., for security purposes) to devices at a gaming establishment 410. In other words, data transmitted to and from first computer resource 404 may not be available to second computer resource 406, and vice versa (e.g., unless the communication is from first computer resource 404 to second computer resource 406 or vice versa).

MSP system 400 also includes a gaming device 408 (e.g., EGMs 104A-X) at gaming establishment 410 (e.g., a casino). MSP environment 402 is in communication with a database 412 (e.g., via a communication channel 411), a check printer 414 (e.g., via a communication channel 413), and a banking computer system 416 (e.g., via a communication channel 415). MSP environment 402 is further in communication with an FST computer device 418 and a remote check printer 420 (e.g., directly or via FST computer device 418).

In the example embodiment, a jackpot may be "hit" (e.g., determined to be presented) at gaming device 408. A casino device at gaming establishment 410 (e.g., gaming device 408 or another device) may communicate gaming data associated with the jackpot (e.g., as described herein) to MSP environment 402. First computer resource 404 may verify the gaming data with information stored in a database 412 in order to verify that the jackpot is valid.

Validation of the jackpot may be performed by any of the processes, or combination of the processes, described herein. Additional and/or alternative processes are also envisioned. Upon validation of the jackpot, MSP environment 402 may automatically trigger payment of at least a portion of a jackpot amount associated with the jackpot. For example, second computer resource 406 may cause a check to be printed at check printer 414 in communication with MSP environment 402. As another example, second computer resource 406 may cause a check to be printed at remote check printer 420 (e.g., at gaming establishment 410). Further, second computer resource 406 may transmit a message to FST computer device 418 (e.g., associated with a field service technician (FST)) that may cause a check to be printed at remote check printer 420 (e.g., after further verification).

An option may be provided to pay players directly from a game provider (e.g., associated with gaming device 408) or a casino operator (e.g., of gaming establishment 410)) by check (e.g., within four hours). Some options may be fulfilled at least in part by a Field Service Technician (FST) when they arrive on-site to complete a full verification (e.g., within four hours). To allow payment to a player without an on-site verification by a FST, a casino representative may complete an on-phone or online verification (e.g., such as email or instant messaging via the internet) with a MSP department and/or MSP environment 402 to, as examples, ensure the validity of the jackpot (e.g., by first computer resource 404), and supply game player ID information, proof of payment, and associated tax forms (e.g., by second computer resource 406).

In some embodiments, instead of on-phone verification, data may be automatically grabbed by MSP environment 402 from a device (e.g., 408) at gaming establishment 410 for automatic comparison with stored data (e.g., at database 412). For example, data pulled/grabbed by MSP environment 402 may include first data generated by gaming device 408 (e.g., including device data such as device ID and gameplay data regarding gameplay at gaming device 408) and the first data may be compared against second data (e.g., predefined verified data for comparison with the first data) by first computer resource 404. In some embodiments, the first data may be associated with gaming device 408 and transmitted to MSP environment 402 via a gaming server (e.g., a gaming server at gaming establishment 410 that monitors gaming device 408).

For example, in some embodiments, an on-site (e.g., at gaming establishment 410) jackpot verification may be performed at least in part by an FST (e.g., that adheres to any regulatory agency or casino in-house procedures). Interfaces may be provided at FST computer device 418 that prompt certain inputs that are transmitted to MSP environment 402.

The dispatched FST (e.g., or other authorized representative) may be responsible for jackpot verification in the field. Jackpot verification in the field may include opening gaming device 408, verifying certain seals inside gaming device 408, resealing gaming device 408, if required, and updating a service case at MSP environment 402 by providing inputs at FST computer device 418.

While certain steps herein are described as being performed by, as examples, an FST or other personnel, it should be appreciated that those steps are, in some embodiments, performed automatically by one or more computer devices described herein (e.g., at MSP environment 402) and/or via one or more interactive graphical user interfaces (GUIs) (e.g., at gaming device 408, at FST computer device 418, at player computer device 422, etc.). For example, in some embodiments a quick response (QR) code may automatically be displayed on gaming device 408 after a jackpot is triggered. An FST may scan, by FST computer device 418, the QR code and scanning the QR code may cause transmission of data associated with gaming device 408 (e.g., or the jackpot) to MSP environment 402 (e.g., or may cause a connection between MSP environment 402 and gaming device 408 to be established so that MSP environment 402 can request and receive data from gaming device 408 (e.g., for verification purposes)). In some embodiments, scanning the QR code may cause display of certain data at FST computer device 418 (e.g., the example GUIs described herein).

Certain verifications may be performed based on inputs at or automatically transmitted from, as examples, gaming device 408, FST computer device 418, or player computer device 422 (e.g., associated with a player or other authorized casino personnel). For example, the inputs are prompted to be provided by a GUI provided at gaming device 408, FST computer device 418, or player computer device 422, as examples. The inputs are transmitted to first computer resource 404 (e.g., via first communication channel 405) and are compared by first computer resource 404 against verification data (e.g., pre-verified or pre-authenticated data) stored in database 412 (e.g., or are accepted as "new" inputs if no verification data for certain inputs is stored in database 412).

For example, inputs may include: gaming establishment name, gaming establishment address, personnel observations (e.g., behavior of individuals near gaming device 408), gaming device observations (e.g., regarding the appearance of gaming device 408), gaming establishment contact observations (e.g., regarding any suspect activity associated with gaming establishment 410), jackpot amount, game theme, time of jackpot, jackpot type, date of jackpot, gaming device verification (e.g., asset number, serial number, seal number(s), program number, gaming device signature string, etc.) game title, gaming device house number, gaming device serial number, seal number (e.g., from a seal located around a logic cage of gaming device 408), verification that the logic cage seal has not been tampered with or broken, game variation, and game program number.

FIGS. 5-9 illustrate example GUIs that may be provided at, as examples, gaming device 408, FST computer device 418, or player computer device 422 during the verification process described herein. In the example embodiment, first computer resource 404 receives inputs based on inputs at the GUIs (e.g., via communication channel 405) and, based on the inputs, stores the inputs in database 412 or compares the inputs to known data stored in database 412. In some embodiments, data is automatically pulled from gaming device 408 or another device at gaming establishment 410 that is associated with gaming device 408.

Figure 5:
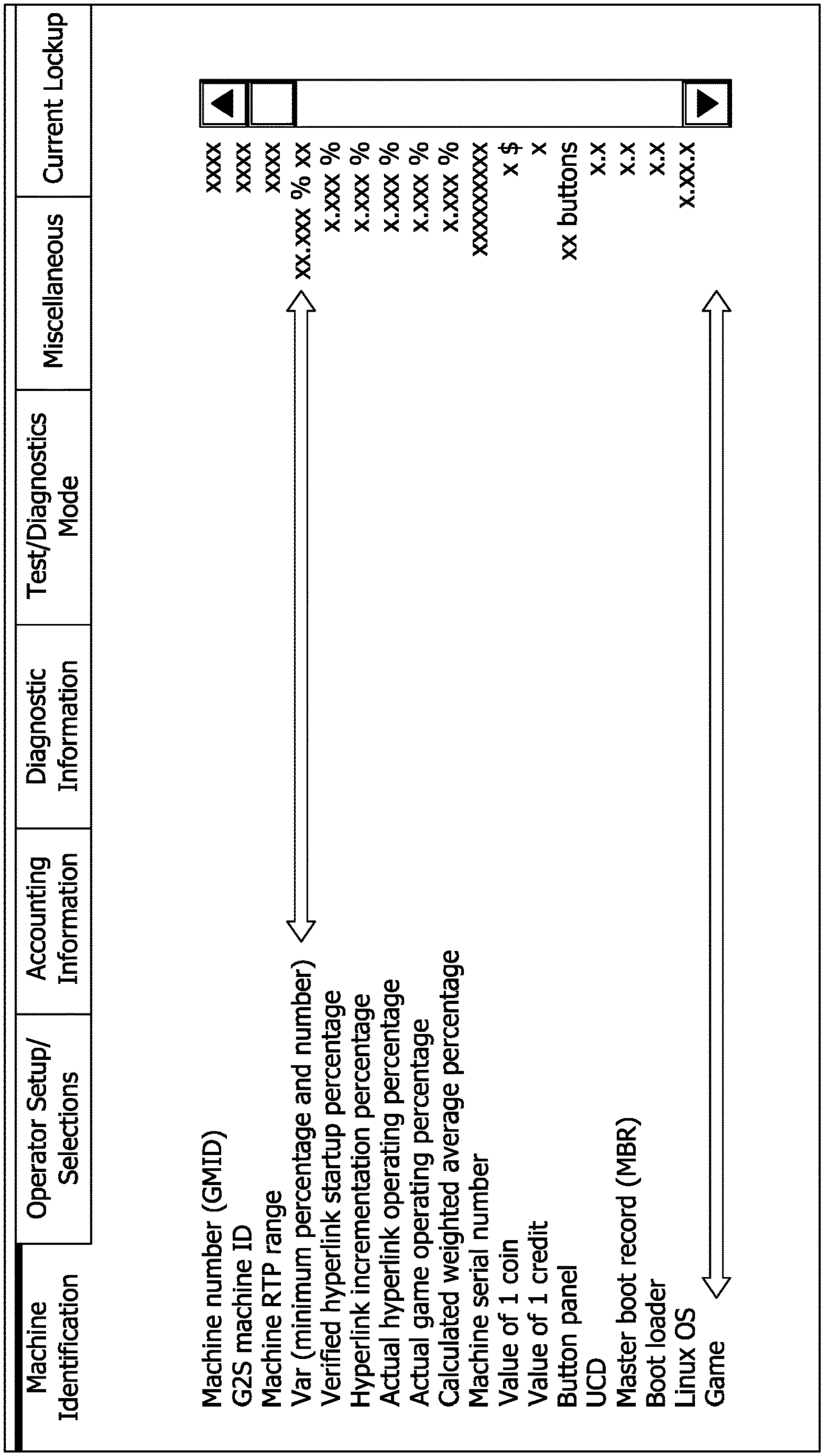
FIG. 5 illustrates an example graphical user interface (GUI) for providing expedited outputs in electronic gaming in accordance with the present disclosure.

For example, to collect a game variation and program number, a certain process may need to occur. An FST may need to open gaming device 408, turn it on, retrieve an EGM audit key, insert it in a meter/audit switch, and turn it clockwise. In response to detecting the switch being turned, a Machine Identification tab (e.g., as shown in FIG. 5) may be displayed by gaming device 408. The FST may record the value in the variation (min % and number) field and record the value in the game field (e.g., a game program number) in a GUI provided at FST computer device 418. The inputs provided at the GUI at FST computer device 418 are transmitted to first computer resource 404 for storage (e.g., at database 412) or verification. In some embodiments, data displayed by gaming device 408 may be automatically transmitted from gaming device 408 to first computer resource 404 (e.g., after prompting by first computer resource 404) via first communication channel 405 for storage or verification (e.g., not requiring inputs at FST computer device 418).

Figure 6:
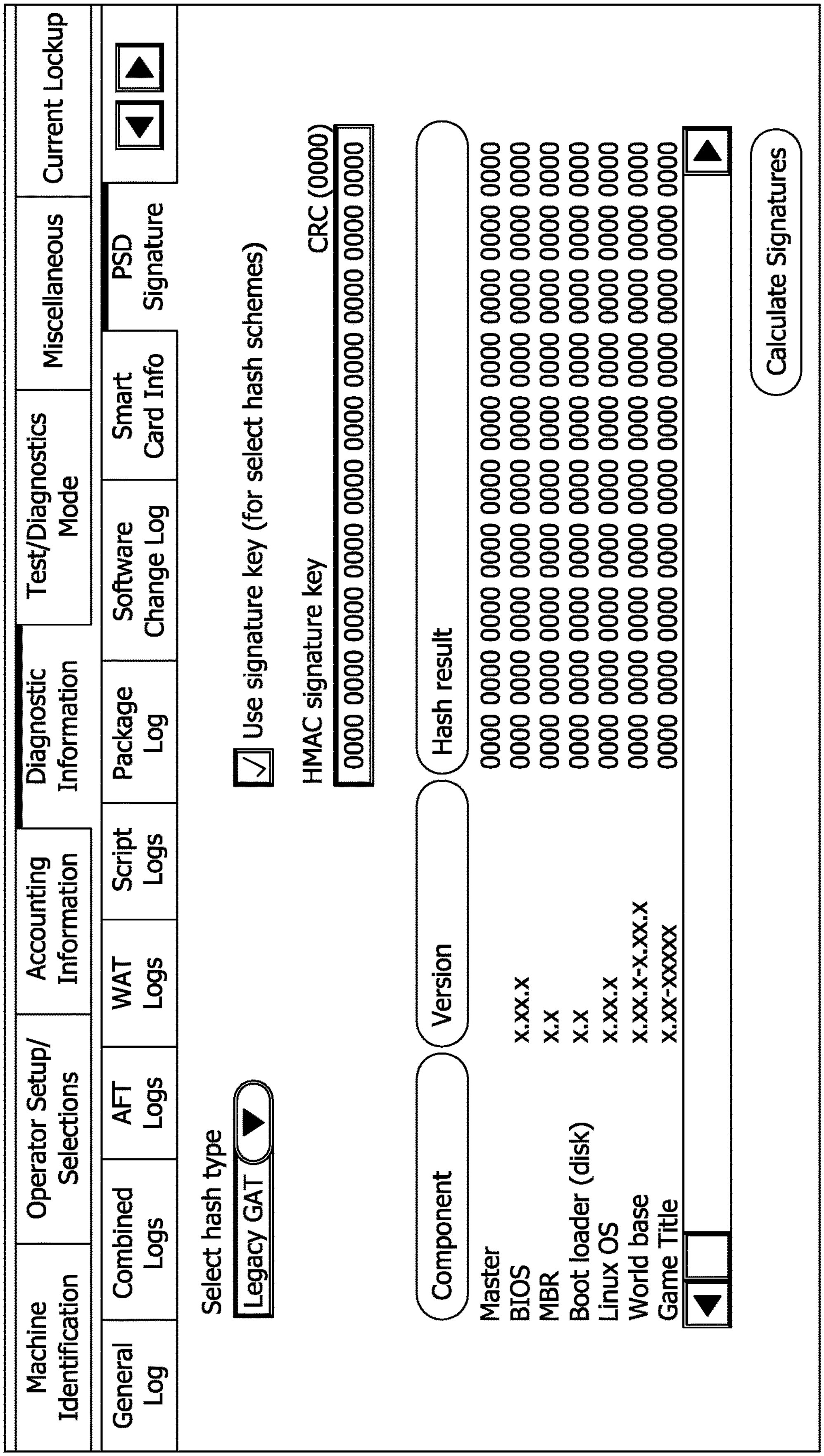
FIG. 6 illustrates another example graphical user interface (GUI) for providing expedited outputs in electronic gaming in accordance with the present disclosure.

Signature verification (e.g., a digital signature) may also be required. In signature verification, an audit mode may be entered on a GUI provided by gaming device 408. On a top row of tabs, a diagnostics information tab may be selected (e.g., as shown in FIG. 6), then on the second row of tabs, a PSD signature tab may be selected (e.g., as shown in FIG. 6). A select hash type arrow may be selected, and a legacy GAT may be selected. A use signature key checkbox may be selected. A tap the calculate signatures button may be selected. In some embodiments, a predetermined amount of time (e.g., two-to-three minutes) may be required for the signature to calculate. Game title signature information may be inputted at a GUI provided at FST computer device 418. The inputs provided at the GUI at FST computer device 418 are transmitted to first computer resource 404 for storage (e.g., at database 412) or verification. In some embodiments, data displayed by gaming device 408 may be automatically transmitted from gaming device 408 to first computer resource 404 (e.g., after prompting by first computer resource 404) via first communication channel 405 for storage or verification (e.g., not requiring inputs at FST computer device 418). For example, the calculated signature may be compared to a known verify signature (e.g., recorded in an EEPROM Description Sheet (EDS) stored in database 412 (see FIG. 7 for an example)).

For example, FIG. 7 illustrates an example excerpt of a PAR sheet (e.g., payout percentages for ensuring a game reaches an expected payout percentage—the par result). The data on the PAR sheet is used by various regulatory agencies as a means of insuring that the software used in an EGM is approved by certain governing bodies (e.g., Gaming Labs International (GLI), Nevada Gaming Control Board (NGCB), etc.). In some embodiments, verified data associated with the PAR sheet is stored at database 412.

The generated Secure Hash Algorithm (SHA) values shown in FIG. 7 are a signature of the software and are consistent across all games with the same program number. The signatures shown in FIG. 7 should match the HMAC signature key (e.g., shown in FIG. 6). Should a new iteration of the game software be released, a new PAR Sheet will be approved by the governing bodies with new SHA values. The SHA values are specific to a game theme and program number. Accordingly, one aspect of automatic jackpot verification may include first computer resource 404 verifying signature data associated with a jackpot win (e.g., received from gaming device 408) with known signature data (e.g., stored in database 412).

Figure 8:
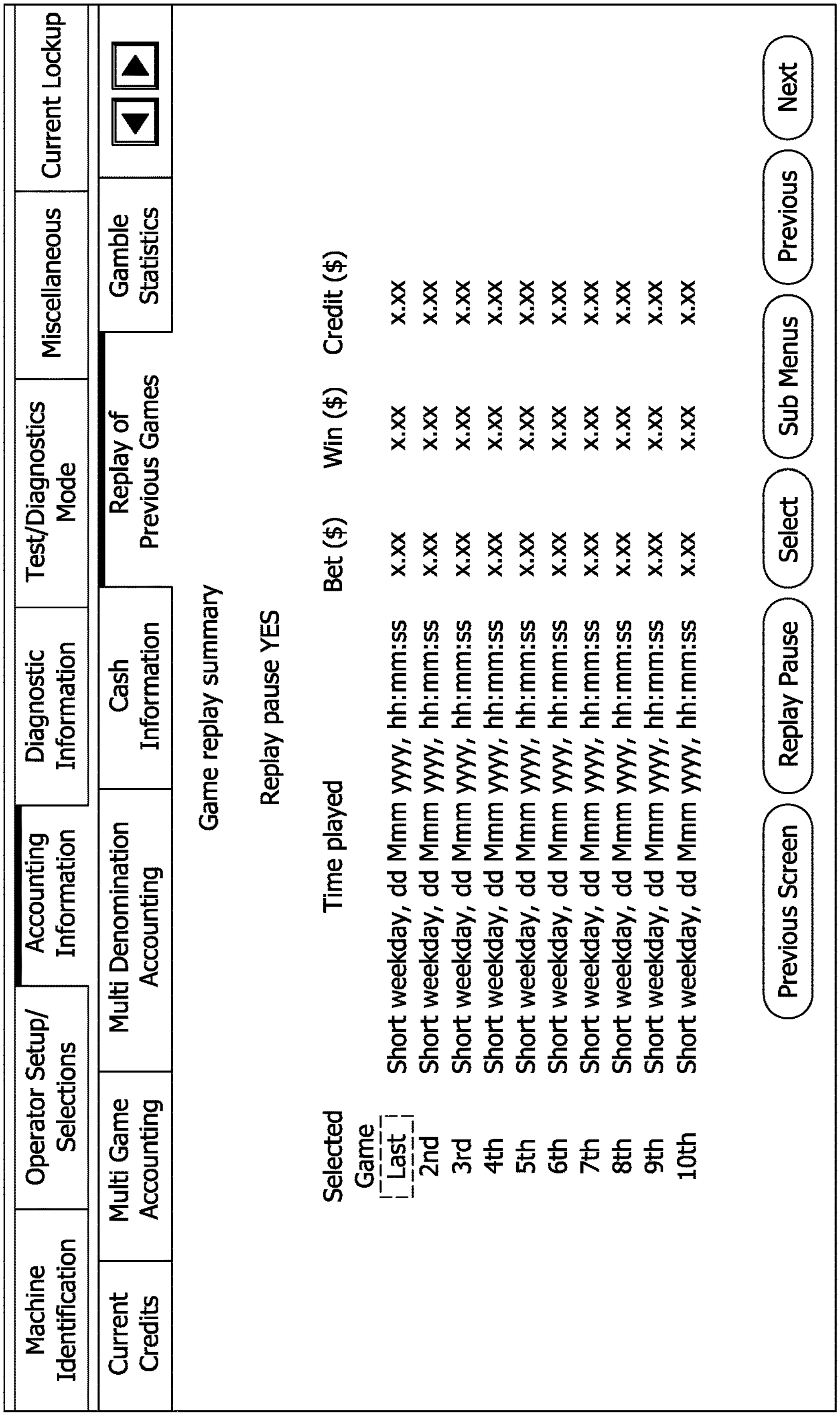
FIG. 8 illustrates another example graphical user interface (GUI) for providing expedited outputs in electronic gaming in accordance with the present disclosure.

In some embodiments, a jackpot amount may need to be determined. A total amount won that is displayed on a main monitor (e.g., display device of gaming device 408) may include both the jackpot amount plus any bonus amounts won during extra feature play at the time of the jackpot award. To verify the jackpot amount, an Audit Mode may be entered on a GUI (e.g., of gaming device 408). An accounting information tab may be selected, followed by selection of a replay of previous games tab (e.g., as shown in FIG. 8).

The GUI may then display a predetermined most-recent number of events recorded by gaming device 408 (e.g., the last ten events recorded by gaming device 408). A next button may be selected to highlight the jackpot to be verified in a selected game column, note of the timestamp in a time played column may be made (e.g., via an input at an interface provided at FST computer device 418), and a sub menu button may be selected. Selection of the sub menu button causes a last game replay meters menu to be displayed. A next button may be selected to highlight an game event logs option, and a select button may be selected. Selection of the select button causes a last game event logs screen to be displayed. A timestamp of the jackpot on an event list may be recorded (e.g., via an input at an interface provided at FST computer device 418), and the jackpot amount in an event type column may be verified (e.g., via an input at an interface provided at FST computer device 418 that is transmitted to and verified by first computer resource 404). The audit mode may then be exited.

Figure 9:
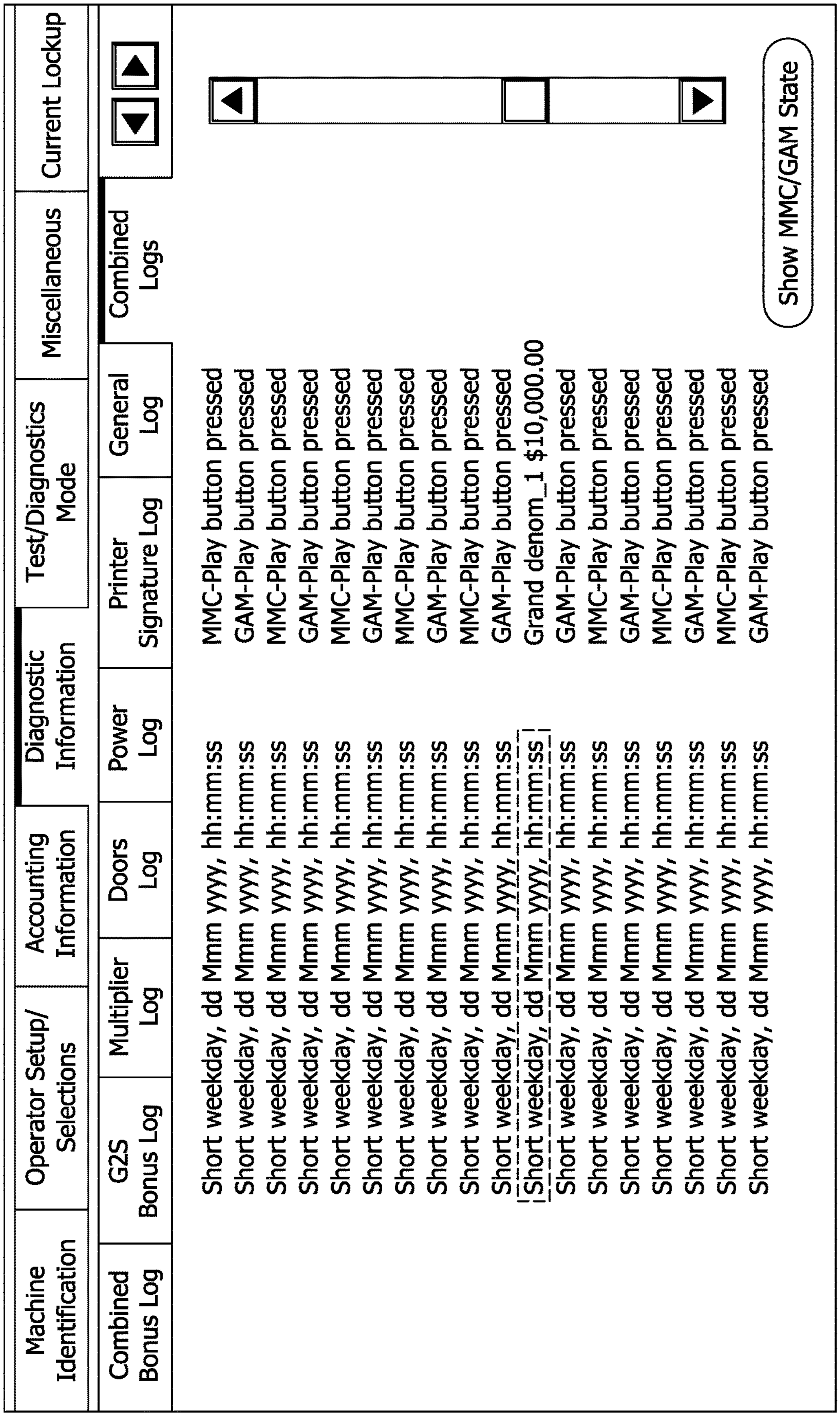
FIG. 9 illustrates another example graphical user interface (GUI) for providing expedited outputs in electronic gaming in accordance with the present disclosure.

In some embodiments, a combined logs method may be implemented including entering an Audit Mode on a GUI (e.g., of gaming device 408), selecting a diagnostic information tab, selecting a combined logs tab, and selecting and moving a scroll bar to locate a jackpot event (e.g., as shown in FIG. 9). Data regarding the jackpot event (e.g., jackpot hit time, jackpot amount, etc.). may then be inputted at a GUI provided at FST computer device 418. The inputs provided at the GUI at FST computer device 418 are transmitted to first computer resource 404 for storage (e.g., at database 412) or verification. In some embodiments, data displayed by gaming device 408 may be automatically transmitted from gaming device 408 to first computer resource 404 (e.g., after prompting by first computer resource 404) via first communication channel 405 for storage or verification (e.g., not requiring inputs at FST computer device 418).

Confirmation of an annuity sticker on a cabinet of gaming device 408 may be recorded (e.g., by an input provided at FST computer device 418 and transmitted to first computer resource 404). Gaming device 408 may be checked for signs of tampering. Gaming device 408 may be photographed. In some examples, the photograph(s) may be sent to first computer resource 404 for analysis. For example, first computer resource 404 may utilize one or more machine learning models to automatically detect potential tampering in image data associated with the photograph(s) (e.g., automatically identifying dents, damage, exposed cables or wires, or other evidence of tampering, for example, based on training data used to train the model).

Certain notifications may be transmitted from MSP environment 402 to other authorized personnel as certain steps described herein are performed (e.g., for security and tracking purposes).

In some embodiments, a game presented by gaming device 408 may be turned off and the main door of gaming device 408 may be opened. The interior of gaming device 408 may then be checked (e.g., for unplugged connectors, loose, hanging, jumped wires, pry marks on or around a logic board and security enclosure). Certain inputs at a GUI (e.g., of FST computer device 418) may indicate that a processor tray of gaming device 408 is properly installed and is not bent or unsecured, certain inputs may indicate that logic cage seals are in place, or if there are no seals, an indication that no seals are present is inputted at a GUI provided at FST computer device 418. The inputs (e.g., the above indications) provided at the GUI at FST computer device 418 are transmitted to first computer resource 404 for storage (e.g., at database 412) or verification.

If a seal break is required, the seal break is performed, and, if required, an SD card is ejected. In some embodiments, a program number is identified. Indications of the seal break (or lack thereof), SD card information, and program number may be inputs provided at the GUI at FST computer device 418 that are transmitted to first computer resource 404 for storage (e.g., at database 412) or verification.

In some embodiments (e.g., for Class 3 games), an on-screen verification is performed based on inputs at gaming device 408 or FST computer device 418. For example, in an audit mode, a signature value associated with gaming device 408 may be transmitted to first computer resource 404 (e.g., automatically from gaming device 408 or based on inputs at FST computer device 418). For example, the signature value may be the SHA value for the game software (e.g., corresponding to the signature key of FIG. 6 and the SHA value of FIG. 7). In other words, the signature value coincides with values on a PAR sheet and are used as a means of ensuring the validity of a jackpot win.

In some embodiments (e.g., for Class 2 games), a client version of gaming device 408 is identified (e.g., and provided to first computer resource 404 via one or more inputs at FST computer device 418) and verified that it matches with documentation in database 412 (e.g., by first computer resource 404). A signature value is identified (e.g., and provided to first computer resource 404 via one or more inputs at FST computer device 418) and compared to the data associated with gaming device 408 at database 412 (e.g., by first computer resource 404). A software verification report is generated (e.g., including approved SHA values/signatures for the game theme software, client version, file name verification, location of the file on a server, the date of the last software verification, and verification date and time). The jackpot may then be verified or not verified (e.g., automatically by first computer resource or as agreed upon by, as examples, an FST and a gaming agent).

If the jackpot is verified (e.g., or at least partly verified), original software is reinserted into gaming device 408, gaming device 408 is turned on, the logic cage is locked, and a new security seal is applied to the logic cage. The gaming device serial number and new seal number are recorded (e.g., and provided to first computer resource 404, for storage at database 412) via one or more inputs at FST computer device 418). Additional security and seal data is recorded (e.g., and provided to first computer resource 404, for storage at database 412). The main door of gaming device 408 is closed and a confirmation is received (e.g., at FST computer device 418 from first computer resource 404) that gaming device 408 is operating normally. Copies of all jackpot verifications are retained at database 412 or a secured storage facility for a predetermined amount of time (e.g., a minimum of five years per gaming regulations).

If the jackpot is not verified (e.g., invalid or not agreed upon as being valid), a compliance team is contacted (e.g., automatically by first computer resource 404) and the compliance team may elect to become immediately involved in the remaining process. In either case, statements may be gathered from certain personnel (e.g., the FST, an on-site casino representative, the jackpot winner (e.g., player), and any other pertinent witnesses). These statements may be recorded and stored by first computer resource 404 at database 412.

The game will remain locked and out of play until first computer resource 404 verifies that all documentation has been obtained including the jackpot verification, any available surveillance tape, and gaming device hardware and relevant operations logs. First computer resource 404 verifies that these activities have been logged in the appropriate MSP service case in database 412.

Once the jackpot is verified process is complete, first computer resource 404 may provide approval to pay the player, provide an approval number, and schedule an FST to go on-site and perform a post-verification inspection of gaming device 408. For example, the approval and approval number (e.g., and player contact information) may be transmitted from first computer resource 404 to second computer resource 406 to trigger second computer resource 406 to initiate communication with the player (e.g., at player computing device 422 via communication channel 407) and obtain banking information to initiate payment of funds (e.g., via banking computer system 416). Once the verification is complete and an approval number has been issued, gaming device 408 may be put back into service for play.

In some embodiments, for post-verification, an FST may be dispatched to gaming establishment 410 (e.g., by first computer resource 404) where the jackpot was presented with the initial payment or reimbursement to collect additional data from the apparent winner (if necessary), casino operator (if necessary), and gaming device 408 that awarded the jackpot (e.g., and cause that data to be transmitted to MSP environment 402). Once the final verification from an on-site inspection is completed, the complete jackpot verification process may be concluded.

In some embodiments, different options for rapid onsite (e.g., at a gaming establishment) payment may be provided. Certain examples are provided below.

Example Expedited Payment Processes

In some embodiments, a game provider may pay the jackpot winner. For example, if the jackpot is deemed to be valid (e.g., as explained above), gaming establishment 410 will need to provide the w-9, copy of photo ID, and player's email address & phone number, before an FST can be dispatched with a check payment for reimbursement to gaming establishment 410. The game provider may call the winner before the check is issued to discuss tax options and withholdings for the winner.

The potential payment may be paid in a number of ways. For example, the player may elect to be paid in a lump sum (e.g., a one-time payment equal to the prorated full amount less any federal/state taxes or withholdings). For lump sum payments, the player will have the option of receiving jackpot payment by wire transfer to a bank account or check (via mail). The player will provide the apparent winner's contact information (e.g., a phone number or alternative phone number and where the apparent winner will be residing for the next 3 business days).

Another option for payment is payment via annuity. For example, the jackpot can be paid in twenty annual payments of the prorated full amount of the jackpot less any federal/state taxes or withholdings.

In embodiments where a game provider reimburses a gaming establishment, if the jackpot is deemed to be valid (e.g., as explained above) and after the gaming establishment pays the winner directly, the gaming establishment will need to provide the w2g, copy of photo ID, winner's email address & phone number, and copy of method of payment issued to winner before a game provider technician (e.g., an FST) can be dispatched with a reimbursement check.

In some embodiments, database 412 is backed up to an onsite data store. These data stores are backed up daily after the daily gaming day rollover. The backups are sent to secure offsite storage. At any given time, a predetermined number of days of backups are stored at a secured offsite location.

A duplicate set of database and progressive controller servers (e.g., at MSP environment 402) are located at a separate, game provider controlled, secondary site. This secondary site serves as a fully functioning disaster recovery site in the event of a major operations failure at MSP environment 402. SQL databases are mirrored in real time to the secondary site.

In some embodiments, MSP meter and jackpot calculations along with data relays are accomplished by three separate applications (e.g., implemented by MSP environment 402).

For example, a concentrator application is configured to run as a service and be executed by MSP environment 402. There is at least one concentrator per gaming establishment 410. The primary functions of the concentrator are to receive gaming device meter information for each participating and active gaming device 408 at gaming establishment 410 and route this information to database 412, verify communication with the gaming device 408, receive ongoing calculated jackpot values from a progressive controller (e.g., that monitors whether one or more progressive jackpots have been hit), transmit this information for display to gaming establishment bank progressive controller(s) and display(s), receive progressive win information from the progressive controller, and transmit this information for display to the casino site bank progressive controller(s) and display(s).

A progressive controller program runs as a service in MSP environment 402. The primary functions of the progressive controller program are to allow gaming devices to contribute the customer play (e.g., wagering) towards a linked progressive jackpot (e.g., at least one level) that is available to participating gaming establishments, receive and record transactions and gaming device meter information in real-time to database 412, keeping data distinct and separate by gaming establishment and gaming device for reporting, calculate the cumulative MSP jackpot values for all participating gaming establishments, transmit information from the database 412 to each participating gaming establishment's concentrator for further disposition such as updating the progressive display values, report MSP jackpot information to database 412, and maintain a record of historical transactions at database 412.

Database 412 provides a central repository that records the transactions and revenue information activity of the MSP system 400. Manual database 412 changes require approval from authorized personnel.

Certain components of MSP environment 402 are responsible for basic monitoring of MSP system 400 and responding to irregular MSP system events (e.g., monitoring jackpot growth and escalating/reporting suspected abnormal behavior, recording the amount of each progressive link through a report, opening a service case for issue tracking, escalation, and documenting progress, and maintaining site documentation regarding major jackpot payouts and any changes to the progressive payout amounts due to malfunction, initiating service cases with vendors when necessary, generating and distributing reports, maintaining the security and integrity of the MSP facilities by ensuring only authorized personnel are permitted access to systems and facilities, assisting in jackpot verifications (e.g., by first computer resource 404), acquiring, organizing, and filing customer site information that includes: customer agreements, property address and contact information, EGM model and serial numbers, EGM logic seal numbers, configuring site-specific information related to concentrator and EGM records, monitoring scheduled backup jobs for completion or errors that require user intervention, administer the offsite backups, maintaining the log of the backups and ensuring successful backup delivery to the offsite storage location, assisting FSTs with appropriate coin-in testing and recording this activity and details/results, notifying and obtaining support on an as needed basis).

A jackpot message may be received, at MSP environment 402, from gaming establishment 410 (e.g., gaming device 408 or other device associated with gaming device 408) that initiates the process of notification and verification of jackpots as described herein.

When a jackpot occurs, first computer resource 404 notifies gaming establishment 410 that a jackpot signal has been received, confirms with gaming establishment 410 that a jackpot is displayed, confirms gaming device 408 information, opens a service case, and contacts certain personnel.

First computer resource 404 may also run a series of reports for the jackpot. Before a jackpot denial, first computer resource 404 notifies a compliance team. After jackpot verification, first computer resource 404 notifies the appropriate personnel (e.g., and second computer resource 406). After jackpot verification, first computer resource 404 notifies regulatory authority.

MSP environment 402 generates various transaction messages. Monitoring and responding appropriately is performed by first computer resource 404. These transaction messages are analyzed in real-time and include jackpot notifications (e.g., based on data received from gaming establishment 410).

The information in the transaction messages includes a message code number, description, casino site name, link, date, time, casino ID, gaming device ID, and gaming device house number. If a runaway meter indication is included in the transaction messages, first computer resource 404 may check a casino router (e.g., associated with gaming establishment 410) and the concentrator for communication related events, run a runaway meter report, and monitor gaming devices for excessive activity.

After a jackpot has at least partly been verified, different payment options may be presented to a player. For example, second computer resource 406 may be notified by first computer resource 404 that the jackpot has been verified and authorize second computer resource 406 to initiate payment.

Second computer resource 406 may then establish communication with player computer device 422 (e.g., based on data regarding player computer device 422 received by second computer resource 406) to obtain (e.g., prompt input of) certain data, as described herein, and provide a list of payment options on an interface presented to the player. While certain players may desire a traditional method of payment, other players may desire expedited payment per one or more of the exemplary payment processes provided herein. Notably, the exemplary expedited payment processes described herein may expedite payment from a matter of days (e.g., 3 days) to a matter of hours (e.g., 4 hours). A few example expedited payment processes are described below.

Marker Gaming Establishment Account

In some embodiments, a player may select a marker/gaming establishment account payment option. A gaming establishment account may be utilized to provide payment to a player. MSP environment 402 is linked to a marker or gaming establishment account at each participating gaming establishment 410 (e.g., casino, tribe, etc.). The gaming account is tied to an MSP account at banking computer system 416. By linking and tying the gaming establishment account and the MSP account to each other, gaming establishment 410 can pull the jackpot payment without permission from MSP environment 402.

As part of the jackpot verification, casino computer resources handle the jackpot verification and gather required supporting documentation (e.g., additionally to or alternatively from first computer resource 404). MSP environment 402 reviews and authorizes all documentation and payment amounts. The gaming establishment resources authorize and issue payment to the player electronically. The gaming establishment resources print required documentation and an authorized signer signs the payment electronically. The gaming establishment pays the winner and money is pulled out of the MSP account linked to the gaming establishment account.

In other words, a gaming establishment account may be utilized for payment. An MSP account (e.g., a payment account, a marker style account, etc.) may be opened with respect to a game provider and with any participating gaming establishment (e.g., casino, tribe, etc.). The gaming establishment account is tied to the MSP account (e.g., associated with a game provider) in banking computer system 416 and allows the gaming establishments to pull the jackpot payment out with game provider permission. The gaming establishment may handle jackpot verification.

First computer resource 404 may verify the jackpot with the gaming establishment and gathers required supporting documentation, as described herein (e.g., via communication channel 405). All documentation and a payment amount may be approved at least in part by MSP environment 402. The gaming establishment may print draft documentation and an authorized signer may sign the payment electronically. The gaming establishment may pay the winner with money pulled out of the MSP account linked to the gaming establishment account. A FST may go onsite for post verification, payment may be recorded through debit data submitted to second computer resource 406, second computer resource 406 may approve the request, and second computer resource 406 may initiate posting of payment to the gaming establishment account (e.g., via banking computer system 416 and communication channel 415).

Debit Card Onsite Payment

In some embodiments, a player may elect debit card onsite payment. In debit card onsite (e.g., at gaming establishment 410) embodiments, first computer resource 404 verifies the jackpot with gaming establishment 410 and obtains required supporting documentation (e.g., via communication channel 405). Second computer resource 406 obtains payment information and/or tax payment options (e.g., via communication channel 407). Second computer resource 406 initiates loading of the payment amount on to a debit card (e.g., via banking computer system 416 and communication channel 415). The debit card is presented to the player onsite (e.g., at gaming establishment 410).

In other words, a debit card onsite payment option may be provided. The debit card onsite payment option may include verification of the jackpot and gathering required supporting documentation by first computer resource 404. Loadable debit cards may be assigned to FSTs for onsite payment. Second computer resource 406 may approve loading the debit card once all required information is verified (e.g., by first computer resource 404) and second computer resource 406 may cause the payment amount to be loaded on the debit card (e.g., via banking computer system 416). The FST may present the debit card to the winner onsite. Payment may be recorded at database 412 via MSP environment 402.

Electronic Transfer Rapid Pay

In some embodiments, a player may elect electronic transfer rapid pay. In electronic transfer rapid pay, first computer resource 404 verifies the jackpot with gaming establishment 410 and obtains required supporting documentation (e.g., via communication channel 405). Second computer resource 406 obtains payment information and/or tax payment options (e.g., via communication channel 407). Second computer resource 406 then processes payment of the jackpot by interfacing with banking computer system 416 to initiate the electronic transfer of funds from an MSP account to a player account (e.g., based on information provided from the player to second computer resource 406 from player computer device 422 via communication channel 407).

In other words, an electronic transfer rapid pay option is provided. The electronic transfer rapid pay option may include first computer resource 404 verifying the jackpot with gaming establishment and gathering required supporting documentation (e.g., via communication channel 405). An FST may be dispatched to the casino. Second computer resource 406 gathers the winner's payment information (e.g., a player account associated with a payment mobile application (app) preferred by the player). Second computer resource 406 may process payment through the proper application (e.g., via banking computer system 416) to initiate the electronic transfer of funds from an MSP account to a player account to process payment through the proper application (e.g., via banking computer system 416).

Wire Transfer

In some embodiments, a player may elect a wire transfer payment option. For a wire transfer, first computer resource 404 verifies the jackpot with gaming establishment 410 and obtains required supporting documentation (e.g., via communication channel 405). Second computer resource 406 obtains payment information and/or tax payment options (e.g., via communication channel 407). Second computer resource 406 then processes payment of the jackpot by interfacing with banking computer system 416 to initiate the electronic transfer of funds from an MSP account to a player account (e.g., based on information provided from the player to second computer resource 406 from player computer device 422 via communication channel 407).

In other words, a wire transfer option is provided. The wire transfer option may include first computer resource 404 verifying the jackpot with the gaming establishment 410 and gathering required supporting documentation (e.g., via communication channel 405). An FST may be dispatched to the casino. Second computer resource 406 may provide tax options to the player at player computer device 422 (e.g., via communication channel 407) and gather the player's bank information (e.g., routing number and account number) based upon inputs at player computer device 422 transmitted to second computer resource 406 via communication channel 407. Second computer resource 406 then processes payment of the jackpot by interfacing with banking computer system 416 to initiate the electronic transfer of funds from an MSP account to a player account (e.g., based on information provided from the player to second computer resource 406 from player computer device 422 via communication channel 407).

Check Payment (Local)

In some embodiments, a player may elect a check payment option wherein gaming establishment 410 is local to a game provider (e.g., within a same or nearby region). First computer resource 404 verifies the jackpot with gaming establishment 410 and obtains required supporting documentation (e.g., via communication channel 405). First computer resource 404 verifies with gaming establishment 410 if the game provider will be paying the winner or if gaming establishment 410 will be handling the payment (e.g., and receiving a reimbursement from the game provider). If first computer resource 404 verifies that the game provider will pay (e.g., based on one or more inputs received via communication channel 405), second computer resource 406 initiates communication with player computer device 422 to obtain payment information and/or tax payment options (e.g., via communication channel 407).

Second computer resource 406 remotes into a workstation (e.g., associated with check printer 414) and causes check printer 414 to print a check associated with the jackpot amount. Second computer resource 406 further interfaces with banking computer system 416 (e.g., via communication channel 415) and sends a positive pay message that causes banking computer system 416 to authorize the check. An FST is dispatched to the gaming establishment 410 with the check to present to the player associated with the jackpot (e.g., or to present to gaming establishment 410 for reimbursement in embodiments where gaming establishment 410 pays the player). The FST is required to sign the stub and gather a signature from the player or casino representative. Confirmation of the signatures may be received at MSP environment 402 (e.g., from FST computer device 418) and MSP environment 402 may cause the confirmation to be stored at database 412.

In other words, a local check payment option is provided. The local check payment option may include first computer resource 404 verifying the jackpot with the gaming establishment and obtaining required supporting documentation (e.g., via communication channel 405). First computer resource 404 may verify with gaming establishment 410 if the game provider will be paying the player or if gaming establishment 410 will be handling the payment and receiving a reimbursement from the game provider. If first computer resource 404 verifies that the game provider will pay (e.g., based on one or more inputs received via communication channel 405), second computer resource 406 initiates communication with player computer device 422 to obtain payment information and/or tax payment options (e.g., via communication channel 407). Second computer resource 406 remotes into a workstation (e.g., associated with check printer 414) and causes check printer 414 to print a check associated with the jackpot amount. Second computer resource 406 further interfaces with banking computer system 416 (e.g., via communication channel 415) and sends a positive pay message that causes banking computer system 416 to authorize the check. An FST is dispatched to the gaming establishment 410 with the check to present to the player associated with the jackpot (e.g., or to present to gaming establishment 410 for reimbursement in embodiments where gaming establishment 410 pays the player). The FST is required to sign the stub and gather a signature from the player or casino representative. Confirmation of the signatures may be received at MSP environment 402 (e.g., from FST computer device 418) and MSP environment 402 may cause the confirmation to be stored at database 412. The FST may proceed with onsite post-verification at gaming establishment 410.

Check Payment (Remote)

In some embodiments, a player may elect a check payment option wherein gaming establishment 410 is remote from a game provider (e.g., within a different region). First computer resource 404 verifies the jackpot with the gaming establishment and obtains required supporting documentation (e.g., via communication channel 405). First computer resource 404 verifies with gaming establishment 410 if the game provider will be paying the winner or if gaming establishment 410 will be handling the payment (e.g., and receiving a reimbursement from the game provider). If first computer resource 404 verifies that the game provider will pay (e.g., based on one or more inputs received via communication channel 405), second computer resource 406 initiates communication with player computer device 422 to obtain payment information and/or tax payment options (e.g., via communication channel 407).

Second computer resource 406 verifies a check number and prints the check to a PDF file. Second computer resource 406 transmits a password protected PDF file to FST computer device 418 associated with the appropriate FST. Second computer resource 406 transmits the password for the PDF in a separate email to an email account associated with the FST. The FST then prints the check with the check stock they were provided and remote check printer 420 (printers will be remotely with the FST or will be onsite at certain gaming establishments 410).

Second computer resource 406 interfaces with banking computer system 416 and sends a positive pay to authorize the check to banking computer system 416. The FST is dispatched to the casino (e.g., based upon a notification transmitted from MSP environment 402 to FST computer device 418 via communication channel 407) with the check to present to the player. The FST is required to sign the stub and gather a signature from the winner/casino representative. Confirmation of the signatures may be received at MSP environment 402 (e.g., from FST computer device 418) and MSP environment 402 may cause the confirmation to be stored at database 412.

In other words, a remote check payment option is provided. The remote check payment option may include an first computer resource 404 verifying the jackpot with the gaming establishment and obtaining required supporting documentation (e.g., via communication channel 405). First computer resource 404 verifies with gaming establishment 410 if the game provider will be paying the winner or if gaming establishment 410 will be handling the payment (e.g., and receiving a reimbursement from the game provider). If first computer resource 404 verifies that the game provider will pay (e.g., based on one or more inputs received via communication channel 405), second computer resource 406 initiates communication with player computer device 422 to obtain payment information and/or tax payment options (e.g., via communication channel 407).

Second computer resource 406 verifies a check number and prints the check to a PDF file. Second computer resource 406 transmits a password protected PDF file to FST computer device 418 associated with the appropriate FST. Second computer resource 406 transmits the password for the PDF in a separate email to an email account associated with the FST. The FST then prints the check with the check stock they were provided and remote check printer 420 (printers will be remotely with the FST or will be onsite at certain gaming establishments 410).

Second computer resource 406 interfaces with banking computer system 416 and sends a positive pay to authorize the check to banking computer system 416. The FST is dispatched to the casino (e.g., based upon a notification transmitted from MSP environment 402 to FST computer device 418 via communication channel 407) with the check to present to the player. The FST is required to sign the stub and gather a signature from the winner/casino representative. Confirmation of the signatures may be received at MSP environment 402 (e.g., from FST computer device 418) and MSP environment 402 may cause the confirmation to be stored at database 412.

Confirmation of the signatures may be received at MSP environment 402 (e.g., from FST computer device 418) and MSP environment 402 may cause the confirmation to be stored at database 412. The FST may proceed with onsite post-verification at gaming establishment 410.

As explained herein, in some embodiments, a check printing process may be required. An example check printing process is described below.

At least part of a verification of the jackpot may be completed (e.g., with a copy of the winner's valid photo ID and signed W-9 provided). If gaming establishment 410 is paying, a copy of the player ID, a signed W2G, and proof of payment may be needed. If a game provider is paying, a copy of the player ID and a signed W-9 may be needed. A verbal approval from certain personnel may be needed to start the check printing process.

Second computer resource 406 may remote into an online check writer and begin the check payment process by selecting create and check buttons. A New Payee button may be selected (e.g., if the gaming establishment paid, the name on the check will be the gaming establishment). The Payee name may be inputted (e.g., and may be the only field required) and an add button may be selected. A bank account may be selected and a check number field may be modified to match the check number on the physical check. The Payee created may be selected (e.g., the current jackpot winner). An amount may be inputted into an amount field (e.g., the jackpot amount being paid to the winner minus taxes, if the winner chose to have taxes withheld). The current date may be selected. The current date and the theme of the jackpot may be inputted into a memo field. A save button may be selected followed by a print button. The check is then printed (e.g., at check printer 414).

Then, a bank account may be accessed (e.g., by second computer resource 406 via banking computer system 416) and a positive pay may be sent to authorize the printed check. An account number may be selected/inputted along with a transaction type, a check number (e.g., the number on the printed check), an issue date (e.g., the date printed on the check), an amount (e.g., the total amount printed on the check), the Payee name/memo (e.g., the name of person check is issued to). A continue button may be selected followed by a submit button.

A copy of the check may be scanned and saved in database 412. An FST may be contacted by second computer resource 406 and informed that the check is ready for pickup. The FST may sign for the check when picking up the check.

Figure 10:
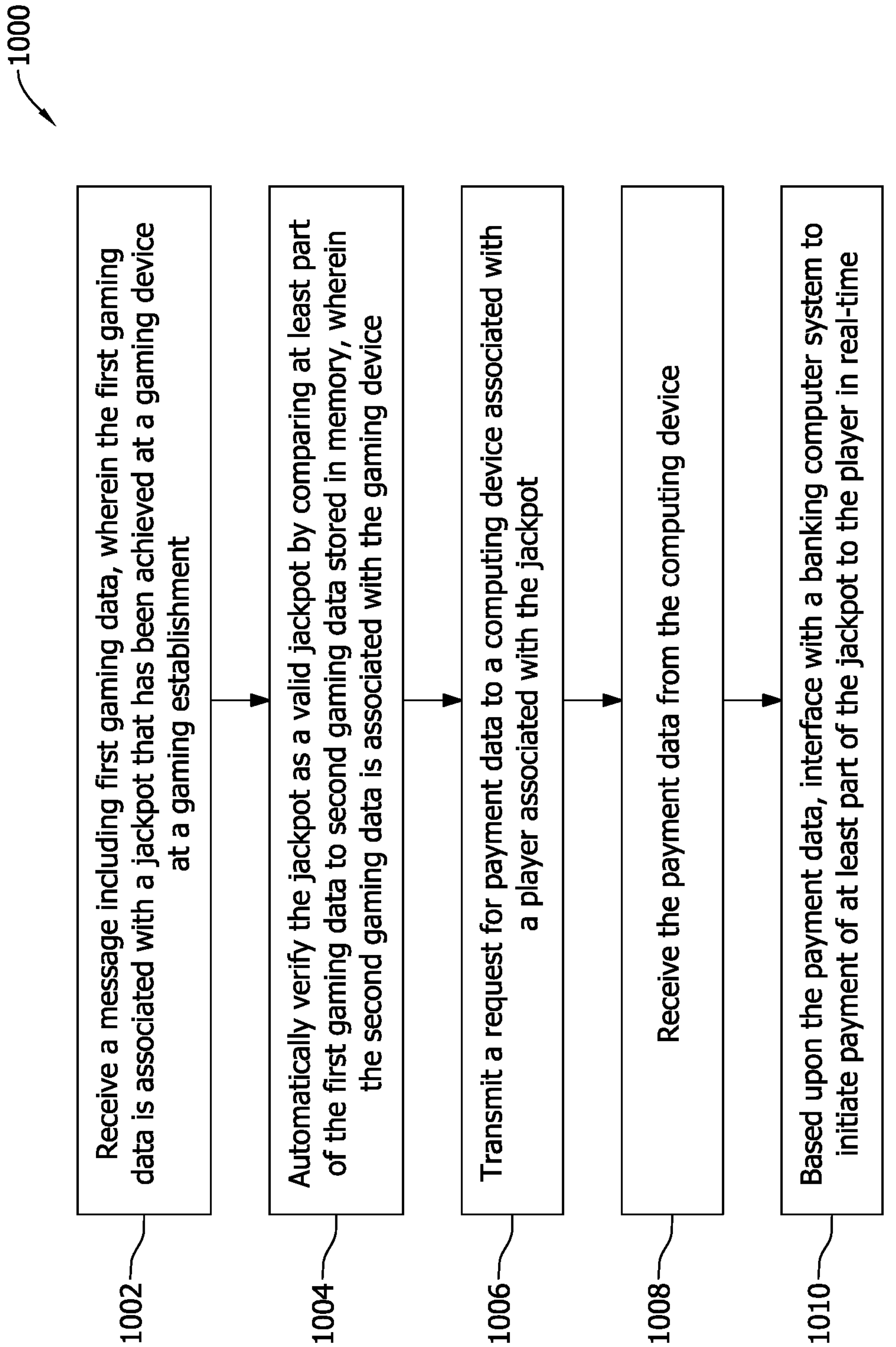
FIG. 10 illustrates an example method for providing expedited outputs in electronic gaming, in accordance with the present disclosure.

FIG. 10 illustrates an example method 1000 for providing expedited outputs in electronic gaming (e.g., as implemented by MSP system 400).

In the example embodiment, method 1000 includes receiving 1002, by a first computer resource (e.g., first computer resource 404), a message including first gaming data wherein the first gaming data is associated with a suspect jackpot that has been triggered at a gaming device (e.g., gaming device 408) at a gaming establishment (e.g., gaming establishment 410) and automatically verifying 1004, by the first computer resource, the suspect jackpot as a valid jackpot by comparing at least part of the first gaming data to second gaming data stored in memory (e.g., database 412) wherein the second gaming data is associated with the gaming device.

In the example embodiment, method 1000 also includes transmitting 1006, by a second computer resource (e.g., second computer resource 406), a request for payment data to a computing device (e.g., player computer device 422) associated with a player associated with the valid jackpot, receiving 1008, by the second computer resource, the payment data from the computing device, and interfacing 1010, by the second computer resource, with a banking computer system (e.g., banking computer system 416) based on the payment data to initiate payment of at least part of the valid jackpot to the player in real-time.

In some embodiments, method 1000 includes determining, by the second computer resource, that the payment data indicates that the player has requested to be paid via a debit card and initiating, by the second computer resource, the payment of at least the part of the valid jackpot to the player by causing at least the part of the valid jackpot to be loaded on to the debit card from the banking computer system.

In some embodiments, method 1000 includes determining, by the second computer resource, that the payment data indicates that the player has requested to be paid via an electronic transfer to a player account and initiating, by the second computer resource, the payment of at least the part of the valid jackpot to the player by causing at least the part of the valid jackpot to be transferred to the player account via the banking computer system.

In some embodiments, method 1000 includes determining, by the second computer resource, that the payment data indicates that the player has requested to be paid via a check, transmitting, by the second computer resource, an authorization for payment of at least the part of the valid jackpot to the banking computer system, and transmitting, by the second computer resource, instructions to print the check to a check printing device (e.g., check printer 414 or remote check printer 420) wherein the check printing device is configured to print the check upon receipt of the instructions, and wherein the check is associated with at least the part of the valid jackpot.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A rapid output system in electronic gaming, the rapid output system comprising:

a first computer resource comprising one or more first processors and one or more first memories, wherein the first computer resource is in communication with a computing device associated with a gaming establishment via a first communication channel, and wherein the one or more first processors are configured to:

receive a message including first gaming data via the first communication channel, wherein the first gaming data is associated with a jackpot that has been achieved at a gaming device at the gaming establishment;

automatically verify the jackpot as a valid jackpot by comparing at least part of the first gaming data to second gaming data stored in the one or more first memories, wherein the second gaming data is associated with the gaming device, and wherein the first gaming data comprises verified data based upon the comparison;

automatically transmit the verified data to a second computer resource based upon the verified data being verified, wherein the verified data comprises verified jackpot data associated with the jackpot being verified and verified player contact information associated with a player that was at the gaming device when the jackpot was achieved; and the second computer resource comprising one or more second processors and one or more second memories, wherein the one or more second processors are configured to:

based upon receiving the verified jackpot data and the verified player contact information, automatically initiate contact, via a second communication channel different from the first communication channel, with a player computing device at the gaming establishment by transmitting a request for payment data to the player computing device via the second communication channel;

receive the payment data from the player computing device via the second communication channel; and based upon the payment data, interface with a banking computer system to initiate payment of at least part of the jackpot to the player in real-time.

2. The rapid output system of claim 1, wherein the one or more first processors are further configured to:

prompt a casino computer device to display a graphical user interface (GUI) associated with the first gaming data, wherein the GUI comprises a plurality of input areas each associated with at least one of a plurality of verification fields; and receive the message including the first gaming data, wherein the first gaming data further comprises at least one input received at at least one of the plurality of input areas.

3. The rapid output system of claim 1, wherein the first gaming data comprises at least one of i) environmental observation data associated with an environment of at least one of the gaming device or the gaming establishment or ii) gaming device data associated with the gaming device comprising a serial number of the gaming device.

4. The rapid output system of claim 1, wherein the payment data comprises tax data associated with the player including a completed IRS Form W-9 and player data associated with the player including a copy of a player photo identification, a player email address, and a player phone number.

5. The rapid output system of claim 1, wherein the computing device comprises a device at the gaming establishment in communication with the second computer resource.

6. The rapid output system of claim 1, wherein the one or more second processors are further configured to:

determine that the payment data indicates that the player has requested to be paid via a debit card; and initiate the payment of at least the part of the jackpot to the player by causing at least the part of the jackpot to be loaded on to the debit card from the banking computer system.

7. The rapid output system of claim 1, wherein the one or more second processors are further configured to:

determine that the payment data indicates that the player has requested to be paid via an electronic transfer to a player account; and initiate the payment of at least the part of the jackpot to the player by causing at least the part of the jackpot to be transferred to the player account via the banking computer system.

8. The rapid output system of claim 1, wherein the one or more second processors are further configured to:

determine that the payment data indicates that the player has requested to be paid via a check;

transmit an authorization for payment of at least the part of the jackpot to the banking computer system; and transmit instructions to print the check to a check printing device, wherein the check printing device is configured to print the check upon receipt of the instructions, and wherein the check is associated with at least the part of the jackpot.

9. At least one non-transitory computer-readable storage medium with first instructions and second instructions stored thereon, wherein:

execution of the first instructions by at least one first computer resource comprising at least one first processor, the at least one first computer resource in communication with a computing device associated with a gaming establishment via a first communication channel, cause the at least one first computer resource to:

receive a signal including first gaming data via the first communication channel, wherein the first gaming data is associated with a jackpot at a gaming device at the gaming establishment;

automatically verify the jackpot as a valid jackpot by comparing at least part of the first gaming data to second gaming data stored in a database, wherein the second gaming data is associated with the gaming device, and wherein the first gaming data comprises verified data based upon the comparison;

automatically transmit the verified data to at least one second computer resource based upon the verified data being verified, wherein the verified data comprises verified jackpot data associated with the jackpot being verified and verified player contact information associated with a player that was at the gaming device when the jackpot was achieved; and execution of the second instructions by the at least one second computer resource comprising at least one second processor cause the at least one second computer resource to:

based upon receiving the verified jackpot data and the verified player contact information, automatically initiate contact, via a second communication channel different from the first communication channel, with a player computing device at the gaming establishment by transmitting a request for payment data to the player computing device via the second communication channel;

receive the payment data from the player computing device via the second communication channel; and in response to receiving the payment data, communicate with a banking computer system to initiate payment of at least part of the jackpot to the player in real-time.

10. The at least one non-transitory computer-readable storage medium of claim 9, wherein the first instructions further cause the at least one first computer resource to:

cause a casino computer device to display a graphical user interface (GUI) associated with the first gaming data, wherein the GUI includes a plurality of input areas associated with respective verification fields of a plurality of verification fields; and receive the signal including the first gaming data, wherein the first gaming data further includes at least one input received at at least one of the plurality of input areas.

11. The at least one non-transitory computer-readable storage medium of claim 9, wherein the first gaming data includes at least one of i) environmental observation data associated with an environment of at least one of the gaming device or the gaming establishment or ii) gaming device data associated with the gaming device comprising a serial number of the gaming device.

12. The at least one non-transitory computer-readable storage medium of claim 9, wherein the payment data includes tax data associated with the player including a completed IRS Form W-9 and player data associated with the player including a copy of a player photo identification, a player email address, and a player phone number.

13. The at least one non-transitory computer-readable storage medium of claim 9, wherein the computing device comprises a device at the gaming establishment in communication with the at least one second computer resource.

14. The at least one non-transitory computer-readable storage medium of claim 9, wherein the second instructions further cause the at least one second computer resource to:

identify that the payment data indicates that the player has requested to be paid via a debit card; and cause the payment of at least the part of the jackpot to the player to be initiated by causing at least the part of the jackpot to be loaded on to the debit card from the banking computer system.

15. The at least one non-transitory computer-readable storage medium of claim 9, wherein the second instructions further cause the at least one second computer resource to:

identify that the payment data indicates that the player has requested to be paid via an electronic transfer to a player account; and cause the payment of at least the part of the jackpot to the player to be initiated by causing at least the part of the jackpot to be transferred to the player account via the banking computer system.

16. The at least one non-transitory computer-readable storage medium of claim 9, wherein the second instructions further cause the at least one second computer resource to:

identify that the payment data indicates that the player has requested to be paid via a check;

cause an authorization for payment of at least the part of the jackpot to be transmitted to the banking computer system; and cause instructions to print the check to be transmitted to a check printing device, wherein the check printing device is configured to print the check upon receipt of the instructions, and wherein the check is associated with at least the part of the jackpot.

17. A method for providing expedited outputs in electronic gaming implemented by a first computer resource comprising a first processor and a second computer resource comprising a second processor, the first computer resource in communication with a computing device associated with a gaming establishment via a first communication channel, the method comprising:

receiving, by the first computer resource, a message including first gaming data via the first communication channel, wherein the first gaming data is associated with a suspect jackpot that has been triggered at a gaming device at the gaming establishment;

automatically verifying, by the first computer resource, the suspect jackpot as a valid jackpot by comparing at least part of the first gaming data to second gaming data stored in memory, wherein the second gaming data is associated with the gaming device, and wherein the first gaming data comprises verified data based upon the comparison;

automatically transmitting the verified data to the second computer resource based upon the verified data being verified, wherein the verified data comprises verified jackpot data associated with the jackpot being verified and verified player contact information associated with a player that was at the gaming device when the jackpot was achieved;

based upon receiving the verified jackpot data and the verified player contact information, automatically initiating contact, via a second communication channel different from the first communication channel, with a player computing device at the gaming establishment by transmitting, by the second computer resource, a request for payment data to the player computing device via the second communication channel;

receiving, by the second computer resource, the payment data from the player computing device via the second communication channel; and interfacing, by the second computer resource, with a banking computer system based on the payment data to initiate payment of at least part of the valid jackpot to the player in real-time.

18. The method of claim 17, further comprising:

determining, by the second computer resource, that the payment data indicates that the player has requested to be paid via a debit card; and initiating, by the second computer resource, the payment of at least the part of the valid jackpot to the player by causing at least the part of the valid jackpot to be loaded on to the debit card from the banking computer system.

19. The method of claim 17, further comprising:

determining, by the second computer resource, that the payment data indicates that the player has requested to be paid via an electronic transfer to a player account; and initiating, by the second computer resource, the payment of at least the part of the valid jackpot to the player by causing at least the part of the valid jackpot to be transferred to the player account via the banking computer system.

20. The method of claim 17, further comprising:

determining, by the second computer resource, that the payment data indicates that the player has requested to be paid via a check;

transmitting, by the second computer resource, an authorization for payment of at least the part of the valid jackpot to the banking computer system; and transmitting, by the second computer resource, instructions to print the check to a check printing device, wherein the check printing device is configured to print the check upon receipt of the instructions, and wherein the check is associated with at least the part of the valid jackpot.

* * * * *